United States Patent [19]
Dang et al.

[11] Patent Number: 5,666,337
[45] Date of Patent: Sep. 9, 1997

[54] DATA STORAGE APPARATUS HAVING A COLUMNAR ARRAY OF INPUT-OUTPUT STORAGE RECEPTACLES WITH PHYSICAL INTERLOCK MEANS

[75] Inventors: Chi-Hung Dang; Chi-Thanh Dang, both of Tucson, Ariz.

[73] Assignee: International Business Machines Corporation, Armonk, N.Y.

[21] Appl. No.: 334,976

[22] Filed: Nov. 7, 1994

[51] Int. Cl.$^6$ .................. G11B 15/68; G11B 17/22
[52] U.S. Cl. .................................. 369/36; 360/92
[58] Field of Search ........................ 360/92, 98.04; 369/34, 36, 39, 192, 178

[56] References Cited

U.S. PATENT DOCUMENTS

| | | | |
|---|---|---|---|
| 4,614,474 | 9/1986 | Sudo | 369/36 |
| 4,742,504 | 5/1988 | Takasuka et al. | 369/36 |
| 4,815,055 | 3/1989 | Fago, Jr. | 369/36 |
| 4,815,056 | 3/1989 | Toi et al. | 369/36 |
| 4,860,133 | 8/1989 | Baranski | 360/92 |
| 4,878,137 | 10/1989 | Yamashita et al. | 360/98.05 |
| 4,912,575 | 3/1990 | Shiosaki | 360/92 |
| 5,006,940 | 4/1991 | Hamachi et al. | 360/92 |
| 5,036,503 | 7/1991 | Tomita | 369/36 |
| 5,274,516 | 12/1993 | Kakuta et al. | 360/92 |
| 5,303,214 | 4/1994 | Kulakowski et al. | 369/34 |

FOREIGN PATENT DOCUMENTS

| | | |
|---|---|---|
| 284445A | 9/1988 | European Pat. Off. . |
| 3-125370 | 5/1991 | Japan . |

OTHER PUBLICATIONS

IBM Technical Disclosure Bulletin vol. 36, No. 08, pp. 495–496, Aug. 1993.

*Primary Examiner*—Stuart S. Levy
*Assistant Examiner*—Brian E. Miller
*Attorney, Agent, or Firm*—H. F. Somermeyer

[57] ABSTRACT

Data storage apparatus having an array of cartridge-storing receptacles with a media device at one extremity of the array, provides cartridge input-output either at all of the receptacles or at a predetermined number of such receptacles. The media device may face the travel of an accessing mechanism such that a holder in accessing mechanism loads a cartridge onto the media device while the holder is situated at the media device. Interlock means prevent the removal of cartridges while the accessing means holder is active in an IO range of the receptacles. Moving the accessing means out of the IO range of receptacles, such as to the media device, enables manual insertion and removal of cartridges. A plurality of the cartridges are kept in respective slots of the cassettes. These cassettes are removably inserted into respective ones of the receptacles. Insertion and removal of cartridges is via manually removing a cassette from its receptacle, changing any cartridges, then returning the cassette, or a replacement, into its receptacle. Each slot of each receptacle in the IO range provides for cartridge input-output as well as long-term storage of cartridges therein. Manual requests for changing cartridges are honored during data processing. In response to a request, the holder is move out of the IO range and kept outside of the IO range. The cartridges are exchanged. Then a manual indication is given that the cartridge changing is complete. An automatic inventory of the removed cassettes ensues followed by usual data processing.

5 Claims, 4 Drawing Sheets

DATA STORAGE APPARATUS HAVING A COLUMNAR ARRAY OF INPUT-OUTPUT STORAGE RECEPTACLES WITH PHYSICAL INTERLOCK MEANS

DOCUMENT INCORPORATED BY REFERENCE

Kulakowski et al U.S. Pat. No. 5,303,214 is incorporated by reference for showing an optical disk cartridge having an access opening.

1. Field of the Invention

This application relates to data storage apparatus, more particularly to data storage apparatus having a library of removable media.

2. Background of the Invention

Peripheral data storage in data processing often includes a so-called media library. In a media library, a plurality of removable disk, tape or card recording media are stored in addressable receptacles or compartments. Such receptacles are arranged in a rectangular array, two facing rectangular arrays, a toroidal array and the like. Each receptacle has an opening in a so-called open-faced wall of the receptacle array. An accessing means includes a media carrier, often termed a picker, that is automatically transported across the face of the open-faced wall of the array(s). A computer controls the movement and actuates the media carrier to fetch a medium from an addressed receptacle for transport to a media device, usually disposed within the array. The media carrier also fetches media from the media device for transport to an addressed one of the receptacles for storage therein. Most media libraries use a so-called traveling elevator that has a carriage moveable along one dimension of the array and an elevator on the carriage disposed for relative movement along an array dimension orthogonal to the carriage movement. In this manner, each and every one of the receptacles and media devices can be accessed. These automatic libraries use most slots exclusively for storing media for use in the library. Other slots are so-called input-output (IO) slots exclusively used for receiving or ejecting media into and from the library. Such media libraries are quite expensive. It is desired to provide for a low-cost operator-intensive data storage apparatus that includes a plurality of receptacles, at least one media device and wherein media are easily imported into and exported from the data storage apparatus. It is desired to provide for automatic fetching and storing of a relatively small number of record media in an arrangement that emphasizes low cost of construction and operation. Such a requirement indicates that the data storage device should be reliable and simple.

DISCUSSION OF PRIOR ART

Kulakowski et al in U.S. Pat. No. 5,303,214 show a data storage apparatus that stores data in any one of a plurality of media types, viz tapes and disks. Each medium is stored in an addressable media storage compartment used exclusively for storing media. One or more traveling elevators automatically transport media between a multiplicity of media receptacles and a plurality of media devices. Separate input-output slots or stations in one of the removable bins are provided for managing and inserting new media into and taking resident media out of the library-type data storage apparatus. The library includes a plurality of removable bins, each bin having a plurality of media receptacles for respectively removably storing tape or disk cartridges. Electronic sensing systems are employed for detecting entry and removal of cartridges from the bins and bins from the library array. Controlled entry and exit (receiving and ejecting) of cartridges require system power on. Kulakowski et al provide for a battery operated library monitoring system while system power is off. It is desired to facilitate cartridge entry and exit into and from a library while system power is off while automatically maintaining library integrity. Accordingly, it is desired to employ a mechanically actuated indicator or flag for indicating, independent of power on or off, entry or exit of data cartridges into and from the data storage apparatus.

A Kulakowski et al cartridge input-output (IO) station has cartridge IO slots installed in one of the removable bins specifically constructed to be an IO bin. Since transient movement of cartridges into and out of the library are only permitted in such IO bins, these IO bins do not provide for long term storage of any cartridges. It is also desired to provide for a random cartridge input-output system in which the cartridge IO system is also used for long term storage of cartridges. Such an arrangement is advantageous in small low-cost libraries for maximizing utilization of each and every feature in a library.

Miyajima in Japan document 3-125370 (May 28, 1991) shows a stack of recording media enclosed by a movable dust cover having an access slit. This arrangement requires that the record media be transported a significant distance from the storage stack of record media. It is desired to avoid such extended transport to provide a compact data storage apparatus having a minimal media transport distance and yet enable a facile media input-output control arrangement.

The IBM Technical Disclosure Bulletin article "EXTENDABLE DATA STORAGE LIBRARY WITH HIGH PERFORMANCE CAPABILITY", Vol. 36, No. 08, pp. 495–496 (August 1993) shows a one-receptacle wide columnar storage array having a dual gripper tape media transport wherein a media device supports the columnar storage array. Retaining means are provided in each of the storage cells (receptacles) in the illustrated arrays. All picker assemblies require a pivoting carriage arm. It is desired to avoid the pivoting carriage arm and reduce costs of the data storage apparatus.

Yamashita et al in U.S. Pat. No. 4,878,137 show a single-receptacle wide columnar array having a pivoting input-output station at one end of the array. A media device is disposed under the end of the columnar array opposite to the input-output station. A belt device picker assembly moves along the columnar array to access the receptacles, to the input-output station (handles one cartridge) and the media device. It is desired to avoid a dedicated input-output station and provide for a more compact and efficient data storage apparatus.

Kitaoka et al (Mitsubishi DKK) in EPO publication EP-284-445-A discloses a single-receptacle wide cartridge-storing array having a media carrier movable across a front open face of the array for transporting cartridges to and from a pair of media devices disposed directly under the array. Cartridges are input and output to and from the apparatus through a single slot in the housing unto a media carrier. Again, it is desired to avoid a unitary input-output arrangement for cartridges.

SUMMARY OF THE INVENTION

The present invention provides a data storage apparatus having a columnar array of plurality of cartridge receptacles. Each of the receptacles stores one cassette having one or more disk, tape or card media. In a preferred form of the invention, each cassette stores a plurality of such disk, tape or card media. Each receptacle has an outer opening for enabling manual access for inserting and removing a cartridge containing cassette into and from said each receptacle. Each receptacle within an IO range not only provides for cassette IO but also provides long term storage of such cassettes within the library. Each receptacle, both within the IO range and outside of the IO range has an inner opening for enabling automatic access for inserting and removing a cartridge into and from said each receptacle. Receptacles outside of the IO range only store cassettes. A media device is disposed adjacent one end of said columnar array, preferably aligned with a path of motion of an accessing apparatus movable along the inner openings of the receptacles. The media device has either a spindle for rotatable supporting a disk medium, a pair of spindles for a two reel tape cartridge or a card translator for card media. The disk or tape is playable while in the respective cartridges. A transducer means in the media device is in a transducing relationship with a record medium within a cartridge supported in the media device. The accessing mechanism includes a medium holder that preferably stays at the media device in a so-called "out of IO range of receptacles". The holder has gripping means for gripping a cartridge for removing and inserting one of the cartridges at a time from and to said receptacles and for mounting a gripped one of said record media in a gripped one of said cartridges on media device for relative motion with the transducer means. Manual control means has a cartridge IO actuate button and a display. Automatic control means is connected to said media device, to said accessing means and to said manual control means for responding to said actuate button being actuated to move said holder to said media device for enabling manual insertion and removal of predetermined ones of said disk cartridges into and from said receptacles in said columnar array. To enable cartridge IO via the media storage slots of a cassette in a receptacle, the accessing mechanism holder moves out of the IO range of receptacles. While the holder is outside the IO range, whether system power is on or not, cartridge IO is enabled via the receptacles in the IO range.

The foregoing and other objects, features and advantages of the invention will be apparent from the following more particular description of preferred embodiments of the invention, as illustrated in the accompanying drawings.

DETAILED DESCRIPTION

Figure 1:
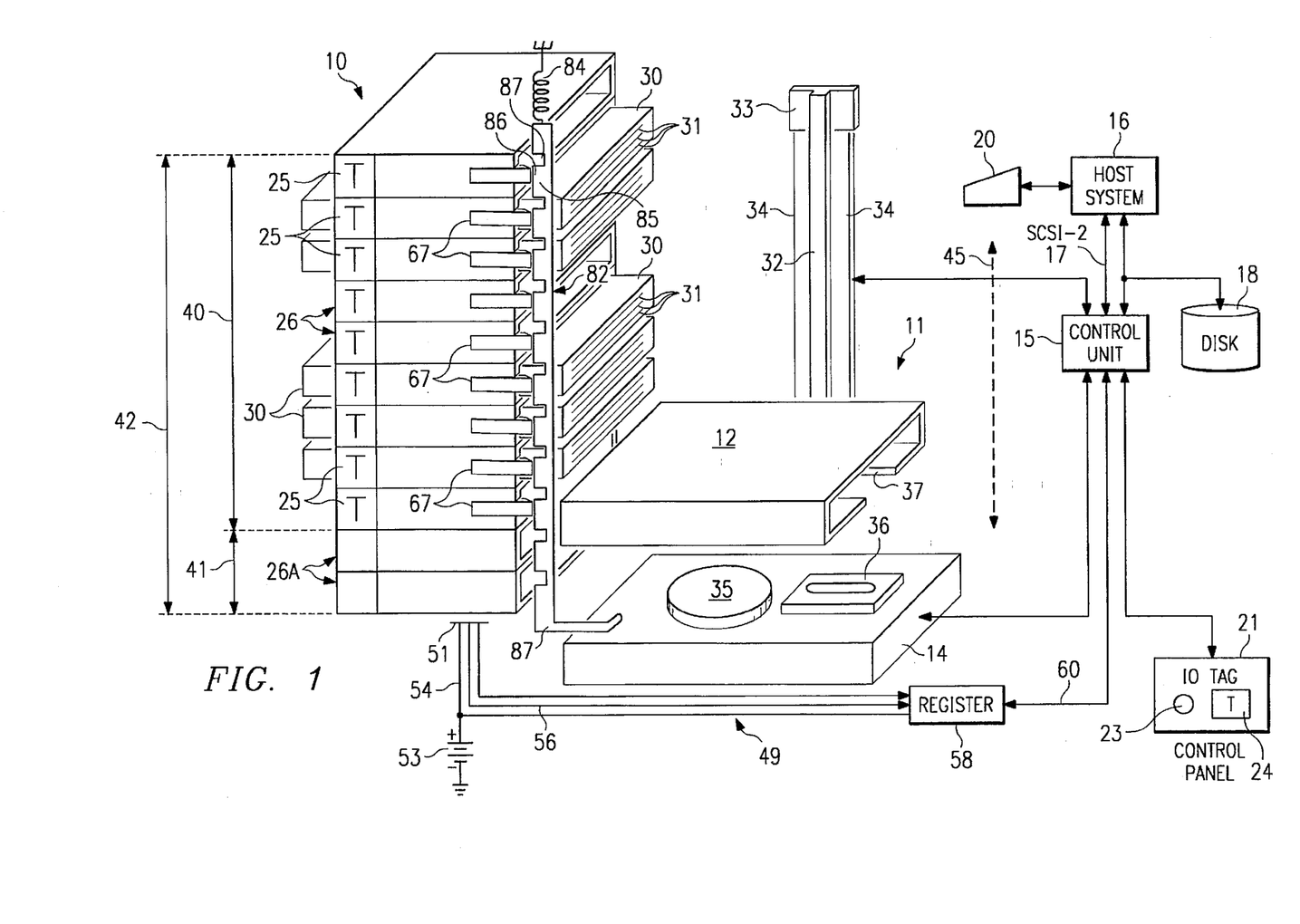
FIG. 1 diagrammatically a data storage apparatus using the present invention.
Figure 6:
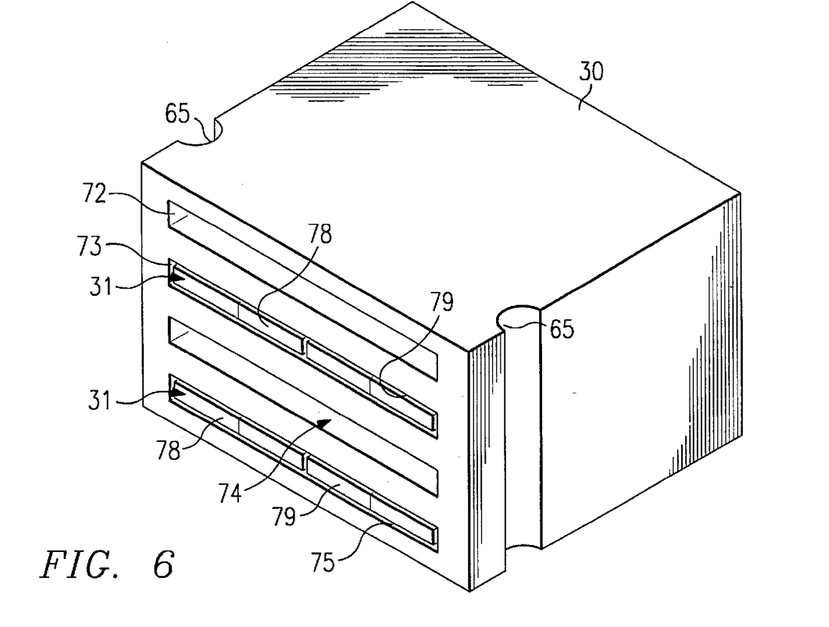
FIG. 6 shows in a simplified diagrammatic perspective view a cartridge-containing cassette for use in the FIG. 1 illustrated data storage apparatus.

Referring now more particularly to the appended drawing, like numerals indicate like parts and structural features in the various figures. FIG. 1 illustrates an illustrative embodiment of the present invention. Single-receptacle-wide columnar array 10 removably stores (long term) a plurality of data-medium-cartridges 31 containing cassettes 30 (FIG. 6). A cartridge 31 is fetched out of its storage slot 72–75 of cassette 30 to be transported by accessing mechanism 11 cartridge holder 12 using picker grippers 12P (FIG. 3) to media device 14. Media device 14 is shown as an optical disk player-recorder, no limitation thereto intended. Media device 14 performs the usual recording operations of recording data, reading data and erasing data. Media device 14 is aligned with the travel path of holder 12 such that holder 12 is in a disk medium play position on media device 14. Media device 14 is disposed below a bottom one of the receptacles 25 such that while holder 12 is in the play position, holder 14 is not aligned with any of the receptacles 26 nor 26A. Each of the receptacles or compartments has a front opening facing holder 12 for enabling random internal accessing of cartridges 31 for transport to and from media device 14. Each of the receptacles or compartments 26 and 26A have a rear opening facing away from holder 12 for enabling external accessing of the cassettes 30, hence cartridges 31. In the illustrated embodiment, such external accessing is manual, no limitation to manual cassette 30 external accessing is intended. Accessing mechanism 11 has a reciprocating elevator comprising a support pole 32, motor 33 and cable 34 for vertically moving holder 12 along the inner open-face wall 13 of array 10. Holder 12 is movably cantilevered from pole 32 in a known manner. As holder 12 descends toward media device 14 with an optical disk cartridge 31 fetched from a cassette 30 (FIGS. 1 and 6), a device hub (not shown but of usual construction) of a contained optical disk engages spindle 35 of media device 14 for rotation therewith. A usual data access opening in each cartridge 30 (as usual in 90 mm and 203 mm diameter optical disks) aligns with optical head assembly 36 for effecting playback and recording. The usual data access opening of a disk cartridge 31 is shown by Kulakowski et al, supra, in his FIG. 16. That showing is incorporated by reference. Holder 12 has an opening 37 aligned with the Kulakowski et al illustrated disk cartridge access opening such that optical head assembly 36 has access to the disk cartridge interior. Each cartridge 31 has an internal machine-readable identification or ID, as is known.

The FIG. 1 illustrated embodiment includes an automatic control system having control unit 15 connected to a host system 16 (such as a main frame, a personal computer, mini computer, workstation computer or the like) via a peripheral connection, such as a small computer standard interconnection (SCSI), version 2 or SCSI-2. Such interconnection is widely used in the art. Keyboard 20 attached to host system 16 inputs commands and requests by an operator, as is known. In the FIG. 1 illustrated embodiment, keyboard 20 is used in one sequence for importing or exporting media into and out of columnar array 10. A disk storage 18 is connected to host system 16 and control unit 15 for purposes that are described later. Control unit 15 automatically controls accessing mechanism 11 and media device 14 in a usual manner.

Control panel 21, disposed adjacent columnar array 10, provides for manual communication and control between an operator and control unit 15 for facilitating manually effected insertion and removal of cartridges into and from columnar array 10. The FIG. 1 illustration shows that all of the receptacles are used for storing cartridges 30 and for being independent input-output stations for the array. In constructed embodiments of this invention, not all of the receptacles in the array need be input-output stations. It is preferred that a given number of the receptacles be so used. For relatively small arrays, it is most advantageous to use all of the receptacles for storage and for input-output. This arrangement enables random input-output of cartridges via any one of the receptacles—a decided advantage in small-capacity arrays. Therefore, a number of dual function storage-input-output receptacles should be selected that provides a randomness feature in the input-output as opposed to a serial input and output as has been commonly practiced.

Control panel 21 includes manually-actuated input-output (IO) switch 23 for enabling an operator to signal control unit 15 that cartridge input or output is desired. Multifunction display 24 indicates to the operator status of the IO request, tag (address) numbers of the receptacles that may be used in the requested cartridge IO, and the like. As will become apparent, manual cartridge IO entry and exit from array 10 is effected in a controlled sequence either with power on or off. Later-described features of this invention enable retentive indications of cartridge changing in each of the respective receptacles 26. Each of the receptacles 26 have a visual readable tag 25 that indicates the address of the respective receptacle. Such tags are used in connection with a host system 16 effected cartridge input or output as will be described later.

In accordance with one aspect of this invention, so-called IO ranges are established in storage array 10. All receptacles 26 within an IO range provide long-term cartridge storage plus cartridge IO functions. As shown in FIG. 1, cartridge storing receptacles 26A are not in a current IO range 40, therefore provide no IO function. Storage range 41 has receptacles 26A that only provide for long-term storage of cartridges, such as provided in the prior art. Numeral 42 denotes a maximum IO range for array 10 as constituting the entirety of the array. In a preferred form of this invention as applied to small libraries, such as having 16 receptacles (no limitation thereto intended), each and every one of the receptacles in storage array 10 are in an IO range such that only while holder 12 is in a play position at media device 14 is holder 12 outside of an IO range of receptacles. While holder 12 is in an IO range, i.e., disposed along columnar array 10 in front of any of the receptacles 26 that are used both as a storage receptacle and an IO receptacle, no cartridges can be entered into nor removed from array 10. Only if holder 12 is at media device 14 outside of such IO range is such cartridge IO permitted.

While only one array 10 is shown in FIG. 1, it is to be understood that additional receptacle arrays may be added within the scope of this invention. For example, dashed line 45 indicates a location of an additional receptacle array juxtaposed to holder 12. In such an additional array, cartridge orientation is preferably reversed for maintaining cartridge orientation for playing in media device 14. Alternately, holder 12 could be made to swivel for making cartridge orientation proper for media device 14, i.e., an opening in a cartridge for enabling in situ media access is always aligned with transducer or optical head assembly 36.

FIG. 1 shows using an electrical sensor system 49 for sensing and indicating cassette 30 (hence cartridge 31) entry or removal. Later-described FIGS. 3–5 describe retentive mechanical indications of cassette 30 entry or removal. Each receptacle 26 in the IO range has a cartridge entry and exit sensor 50 (FIG. 2) for detecting and indicating entry or exit of a cartridge from array 10. Horizontal line 51 (FIG. 1) represents connections to all sensors in receptacles 26 in IO range 40. Power to the sensors is from battery 53 (backup while system power is off and connected to system power when power is on—connection is not shown as it is well known) over line 54 to all sensors 50. The sensors 50 output indications are respectively supplied over separate output lines 55 in cable 56 to register 58, one output line 55 to one digit position of register 58. Register 58 digit positions indicate recent cartridge IO for receptacles 26 in IO range 40 to control unit 15 over line 60 in a usual manner. Control unit 15 after reading the content of register 58 for instituting an updating array 10 inventory (FIG. 10) after any cartridge entry or exit resets all register 58 digit positions.

Figures 2, 3, 4, 5:
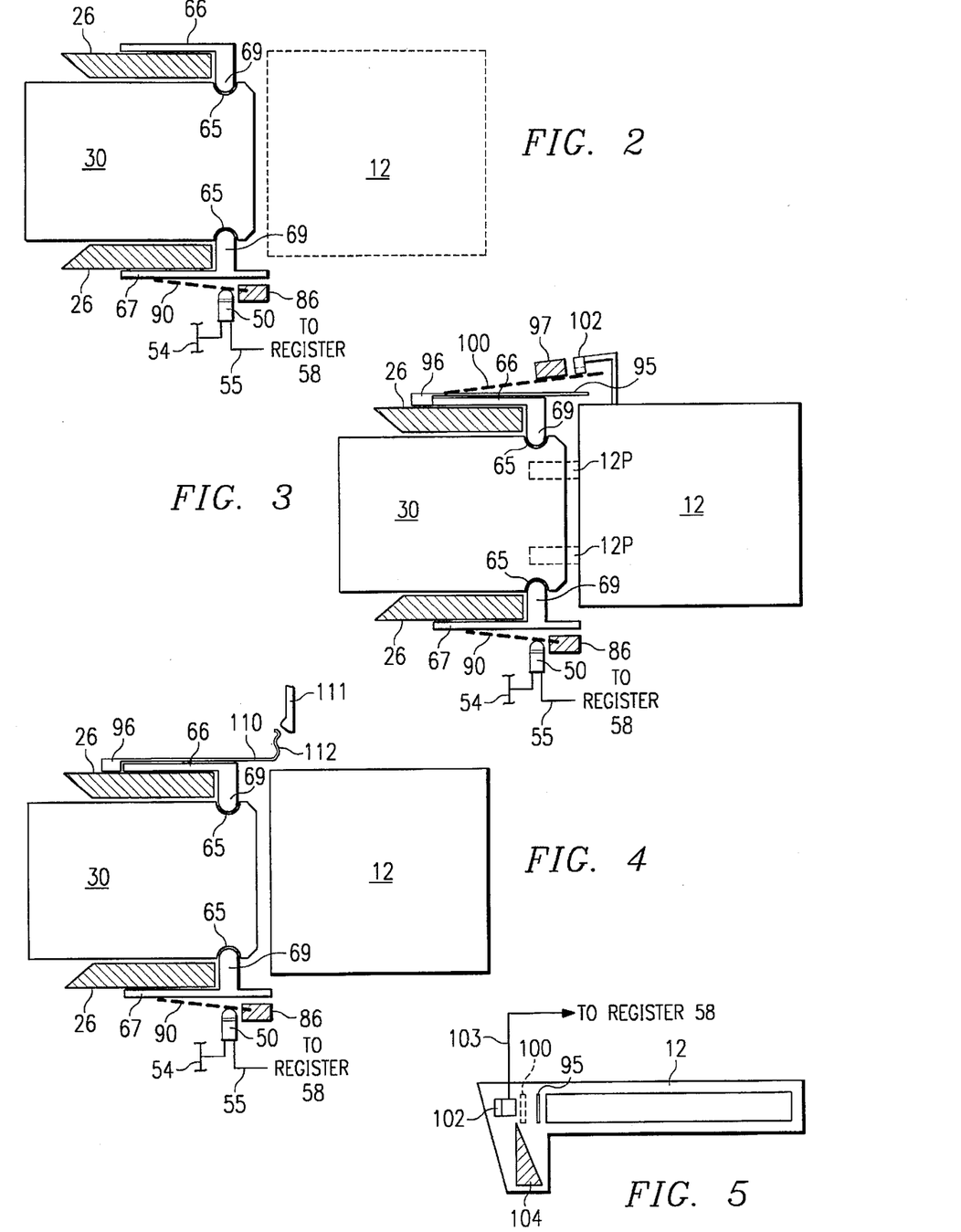
FIG. 2 is a simplified showing of a receptacle in the FIG. 1 illustrated apparatus showing cartridge-holding detect actuation of a cartridge change indicator or flag.
FIGS. 3 and 4 illustrate variations of the FIG. 2 showing.
FIG. 5 shows a holder mounted change-flag control for use in the FIGS. 2–4 illustrated receptacles.

Turning now to FIG. 2, each receptacle 26 receives and removably holds a cartridge-containing cassette 30. As best seen in FIG. 6, each cassette 30 may contain a plurality of optical disk cartridges 31. Each cassette 30 has oppositely outwardly opening detent receivers 65 for being removably retained in a receptacle 26 by spring detents 66 and 67. Each of the detents 66 and 67 have a detent end 69 for engaging cassette 30 in receivers 65. Each cassette 30 may contain a plurality of cartridges 31 in respective cartridge slots 72–75. FIG. 6 shows that but two of the slots 72–76 contain a cartridge. Any number of slots may be conveniently provided in each cassette 30. Each cartridge 31 has an access-opening (not shown) shutter 78 movably disposed in recess 79 for opening and closing the access opening, as is known.

Returning for a moment to FIG. 1, an interlock 82 prevents exit or entry (external access) of a cassette 30 from or to a receptacle 26 unless holder 12 is outside of the IO range 40, i.e., disposed on media player 14. Interlock 82 is spring 84 urged upwardly to a cassette 30 locking position. No cassette 30 can be inserted into nor removed from array 10 while interlock 82 is in the cassette locking position. This locking is also termed closing the rear opening of all of the IO receptacles or compartments in that no cassette 30 can be removed nor inserted through any rear opening during such locking. To this end, vertical slidable locking bar 85 (slide mounts not shown but are known and within ordinary skill of one in this art) has a plurality of array extending locking teeth 86 separate by cassette-freeing gaps 87. In the cassette locking position, locking teeth 86 are vertically aligned with detents 67 as shown in FIGS. 1–4. As holder 12 moves out of the IO range (maximum IO range 42 as shown in FIG. 1), holder 12 engages cassette-freeing arm 87 for forcing locking bar 85 to slide downwards to a cassette freeing position (not shown) wherein gaps 87 are all aligned with the respective detents 67. In the cassette freeing position, detects 67 are free to move away from their respective receptacles 26 to dashed lines 90 to permit cassettes 30 to be inserted into and removed from receptacles 26. Simultaneously to freeing a cassette 30 for removal or permitting cassette insertion, detent 67 engages sensor 50 for actuating the sensor to send a signal over its line 55 to register 58. Sensor 50 may be a sensitive electrical switch, magnetic or electric field sensing device or the like.

As seen in FIGS. 2–4 inserting or removing a cassette 30 into or from a receptacle 26 overcomes the spring urging of detents 66 and 67 to force them outwardly. FIGS. 3 and 4 show no-system-power required mechanical sensing devices that can replace the electrical sensing system of FIGS. 1 and 2 that can either replace or supplement such electrical sensing system. As best seen in FIGS. 3 and 5, steel leaf-spring flag 95 is affixed to receptacle 26 at point 96. As a cassette 30 is inserted or removed from receptacle 26, detent 66 pushes leaf-spring flag 95 against retaining magnetic bar 97 as indicated by dashed line 100. Bar 97 extends vertically (the bar 97 full extent is not shown) in array 10 throughout the IO range of receptacles. As long as leaf-spring flag 95 is held by magnetic bar 97, leaf-spring flag 95 indicates that a cassette 30 has been either inserted and/or removed from the respective receptacle 26. A magnetic sensor 102 mounted on holder 12 senses and indicates that a leaf-spring flag 95 is in the cassette change indicating position (dashed line 100). Line 103 carries the magnetic sensor 102 signal to register 58 for storage therein. The position of holder 12 as magnetic sensor 102 sends its line 103 signal indicates which of the receptacles 26 were subjected to a cassette 30 insertion or removal. Commutation of the signal to register 58 is not shown because commutating a serial signal based on a sensor physical location is well known. Holder 12, upon a power up and after completion of each operator requested IO via switch 23 (FIG. 1), is actuated by control unit 15 to scan all leaf-spring flags 95, starting from outside of IO range position at media device 14. After the position of each leaf spring flag bevel 104, mounted on holder 12, engages the leaf-spring flag in position 100 to move it back to the solid-line indicated position (indicated by numeral 95) shown in FIG. 3.

FIG. 4 shows an alternate arrangement for leaf spring 95. Alternate leaf spring 110, also mounted at point 96 to receptacle 26, has an upstanding latch end portion 112 engageable by catch 111 that is suitably mounted (mount is not shown) to receptacle 26. Any insertion or removal of a cassette 30 from an IO receptacle 26 causes detent 66 to move leaf-spring flag 110 latch portion 112 into locking engagement with catch 111. Sensing and release of leaf-spring flag 110 uses the same sequence and apparatus as shown in FIGS. 3 and 5 for leaf-spring flag 95.

Figure 7:
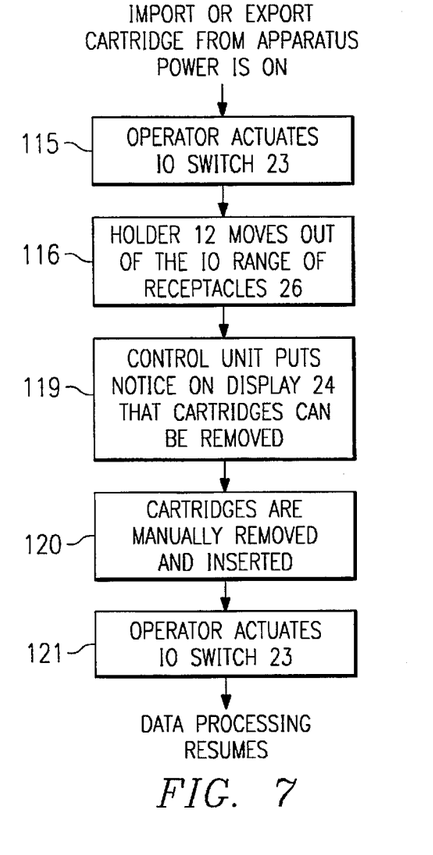
FIGS. 7–10 are machine operation charts showing sequence of operation of the FIG. 1 illustrated apparatus related to selected features of the illustrated embodiment.
Figure 10:
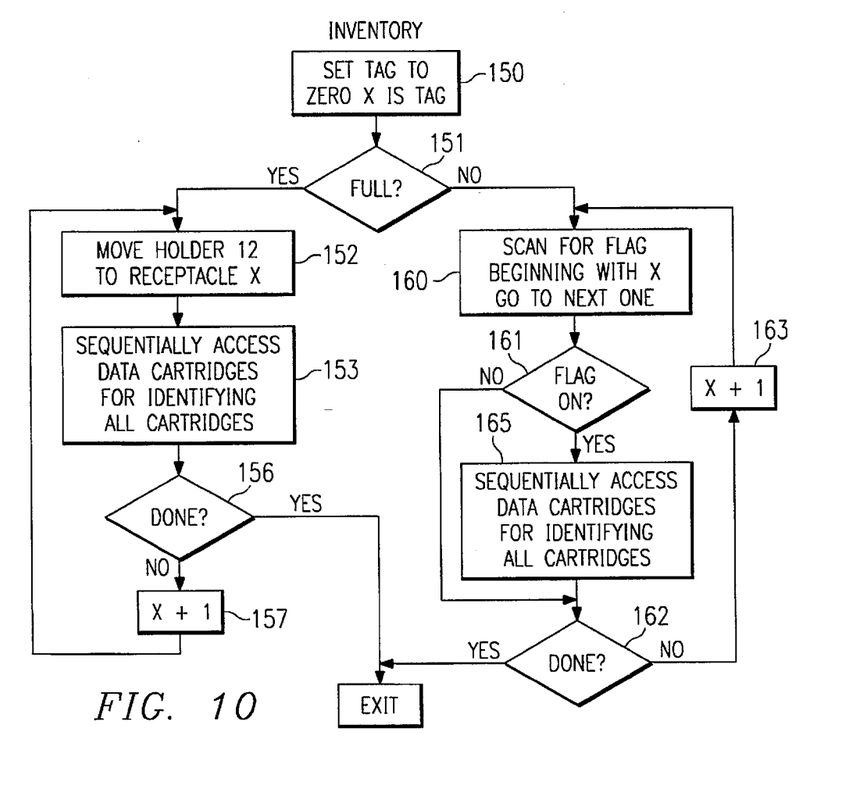

Various sequences of machine-operator operations of the FIG. 1 illustrated apparatus are described in the FIGS. 7–10 machine operations charts. FIG. 7 illustrates entry and exit (importing and exporting) a cartridge 31 to and from array 10 while system power is on (during normal operations). An operator (not shown), in step 115, actuates IO request switch 23 to signal control unit 15 that a cartridge import/export is requested. Control unit 15 responds in step 116 to the manual request (such response may be deferred momentarily to complete some ongoing data processing operations) by moving holder 12 to be out of the IO range. Control unit 15 keeps the holder 12 at media device 14 until a second actuation of IO switch 23. Elapsed time between the two successive switch 23 manual actuations constitutes a cartridge IO session requiring holder 12 to be kept out of the IO range, such as at media device 14. The current IO range 40 ends at the antepenultimate receptacle 25 (illustrated position of holder 12 in FIG. 1). Since the construction of interlock 82 is effective only while holder 12 is at media device 14 to release detents 67. That is out of the IO ranges 40 and 42. Alternate constructions can effect diverse positions of holder 14 to be in or out of a current IO range. In any event, holder 14 is moved to media device 14 in step 116. After holder 12 is out of the IO range, as at media device 14, control unit 15 in step 119 signals the requesting operator on display 24 that cartridges 31 may now be exported or imported. The operator in step 120 removes one or more cassettes 30 for exporting and importing cartridges from and into array 10. Upon completion of step 120, the operator at step 121 again actuates IO switch 23 to signal control unit 15 that cartridge IO has been completed. Therefore, fetching and storing cartridges by holder 12 can be resumed, i.e., holder 12 may now be moved into the IO range of receptacles. Then, in step 122, an updating inventory of the cartridges ensues as shown in FIG. 10. Thereafter, normal data processing operations with the FIG. 1 illustrated apparatus ensue. Of course, during cartridge IO, any cartridge mounted on media device 14 by holder 12 may be accessed in a usual manner.

Figure 8:
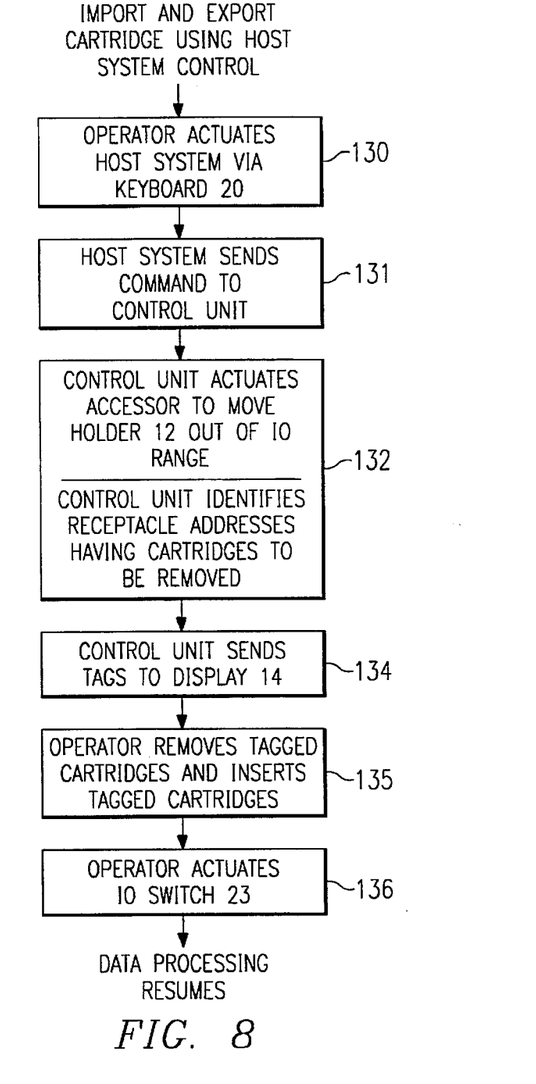

FIG. 8 illustrates importing and exporting cartridges 31 during system power on (system is operating) via host system 16. The operator in step 130, via keyboard 20, sends a request to host system 16 that identified cartridges are to be imported or exported. This request actuates host system 16 to build a command for control unit 15 for such import and export (all as is known). Host system 16 in step 131 sends the command to control unit 15. Control unit 15 in step 132 first builds a list of cartridges, corresponding cassettes holding the identified cartridges and identification (tag 25) identifying the receptacle(s) holding the cartridges and cassette(s). If some of the host system 16 identified cartridges are in receptacles 26A, then control unit 15 actuates holder 12 to move such cartridges to a receptacle 26 in the IO range. Then control unit 15 actuates accessing mechanism 13 to move holder 12 out of the IO range to reside on media device 14. Control unit 15 then sends to display 24 identifications of the cassette(s) containing the cartridges to be exported or cassette(s) in which cartridges are to be imported. Control unit 15 in step 134 sends the tags to display 24. The operator responds in step 135 to the control unit 15 message to remove the cassettes 30 from the identified receptacles 26. The operator also may use the original list of cartridges to be removed inserted from and into array 10 to remove and insert the identified cartridges into and from the removed cassettes 30. Then the cassettes are return to their respective receptacles 26 or substitute cassettes may be used. Upon completing the manual changes, the operator, in step 136, actuates IO switch 23 for indicating to control unit 15 that cartridge IO is completed and that usual data processing operations with the FIG. 1 illustrated operations may ensue. Control unit 15 then, in step 137 conducts an updating inventory as shown in FIG. 10. Then, usual data processing ensues.

Figure 9:
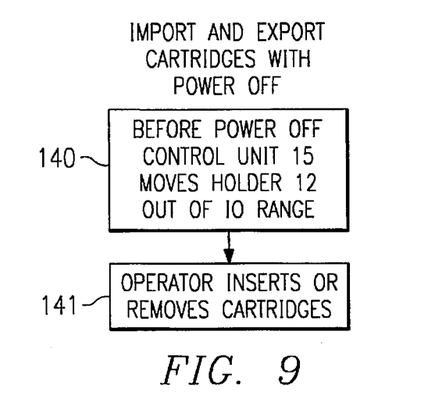

FIG. 9 illustrates a system power off cartridge insertion and removal to and from array 10. At step 140, before power off is completed, control unit 15 moves holder 12 to its home or out of IO range position at media device 14. This action releases interlock 82 from locking cassettes 30 in the respective receptacles 26. During step 141, the operator manually inserts or exits cartridges 31, all as described above. With the manual flag systems of FIGS. 3–5, any removal of a cassette 30 from its receptacle actuates the leaf-spring flags to the cassette entry or exit indicating position. For the electronic flag system of FIG. 1, the battery backup operation of sensors 50 and register 58 capture the removal or insertion of any one of the cassettes 30 from and to array 10. No further action by the operator is required. At power-up time, control unit scans register 58 for flags in the cartridge entry or exit position. Control unit 15 then directs that holder 14 will move to the respective receptacles 26. At each of the flagged receptacles, all of the cartridges in the respective cassettes are sequential removed from the cassette, transported to media device 14. Media device 14, under direction of control unit 15 reads the identification of each cartridge enabling control unit 15 to update its files to reflect any manual insertion or removal of cartridges during power off.

FIG. 10 illustrates an inventorying system for use with the mechanical flags 95. In this regard, an electric switch, not shown, may be attached to each of the leaf-spring flags. At power-up, such switches (not shown) supply input signals to set register 58 positions. Then the procedure described above for updating control unit 15 files is followed. Without such electric switches, the scanning procedure by accessing mechanism 11 and holder 12 is used. In step 150, control unit 15 sets a control flag (not shown) X to zero such that the scan of receptacles proceeds from media device 14 toward the top of array 10. Step 151 determines whether the inventory is a full or updating inventory. An updating inventory occurs after any cassette 30 is removed from any receptacle 26. Such updating can be performed intermediate commanded accesses to data stored in array 10, i.e., during idle times.

A full inventory is employed for integrity checks on the content of array 10 and upon initialization of control unit 15. This full inventory requires fetching and reading cartridge identification of each and every cartridge stored in array 10. First, step 152 (control unit 15 controlled) moves holder 12 to receptacle X, beginning with receptacle 0 near media device 14. Step 153 actuates accessing mechanism 11 and media device 14 to sequentially fetch each cartridge of the addressed receptacle 16, read its identification stored on the cartridge-contained medium and return the cartridge to its slot 72–75 of its cassette 30. An empty slot may be detected in a known manner. For each empty slot in a cassette or empty receptacle (no cassette), control unit notes the empty slot. Upon completing this sequence in each receptacle, step 156 determines whether all of the receptacles have been examined. If yes, then the inventorying is completed and an exit is taken. If no, the scan of all receptacles 26 is not completed. Then step 157 indexes the scan by adding one to X. Steps 152–156 are then repeated.

An updating inventory is performed after each cartridge IO session and after any flag is in the cassette entry or exit indicating position. This updating inventory begins in step 160 in scanning for a flag 95 in the indicating position. The scan examines each receptacle 26. Step 161 determines for each receptacle whether the flag 95 is set to the indication (cassette change) position. If its flag 95 is not set, then step 162 determines if each and every receptacle has been examined. If yes, then an exit is taken. If not, then step 163 increments X (as in step 157) followed by repeating steps 160 et al. Upon detecting a flag 95 in the indicating position, control unit 15 causes accessing mechanism to stop the receptacle scan. Then step 165 causes each slot 72–75 to be scanned for cartridges, all as set forth in step 153. From step 165, step 162 is repeated.

While the invention has been particularly shown and described with reference to preferred embodiments thereof, it will be understood by those skilled in the art that various changes in form and details may be made therein without departing from the spirit and scope of the invention.

What is claimed is:

1. Data storage apparatus for storing and using a plurality of disk cartridges, an improvement including, in combination:

a one-receptacle wide columnar array of disk-cartridge receptacles, each said receptacle for storing a disk cartridge, said receptacles respectively having outer openings for enabling manual access for inserting and removing a disk cartridge into and from said each receptacle, each said receptacle having an inner opening for enabling automatic access for inserting and removing a disk cartridge into and from said each receptacle;

a disk cartridge device disposed adjacent one end of said columnar array, said disk cartridge device having a spindle for rotatable supporting a disk medium in each of said disk cartridges and a transducer means for being in a transducing relationship with a disk medium supported on said spindle;

accessing means disposed adjacent to said columnar array and having a disk cartridge holder movably disposed with respect to said columnar array and said disk cartridge device for movements along said columnar array and to a play position in said disk cartridge device, said holder for removing from, carrying and inserting one of said disk cartridges at a time from and to said receptacles and for mounting a respective one of said disk media in said respective one of said disk cartridges on said spindle for rotation therewith in said play position on said disk cartridge device, said holder while mounting said respective one of said disk cartridges being disposed remote from all of said receptacles;

manual control means having an actuating button and a display;

automatic control means connected to said disk cartridge device, to said accessing means and to said manual control means for responding to said actuating button being actuated to move said holder to said play position in said disk cartridge device for facilitating manual insertion and removal of predetermined ones of said disk cartridges into and from said receptacles in said columnar array;

display control means in said automatic control means connected to said display and to said accessing means for responding to said accessing means moving said holder toward said play position in said disk cartridge device for supplying a signal to said display to indicate that cartridges may be manually removed from and inserted into said array;

physical interlock means in said array having cartridge locking means at each of said receptacles and being relatively movably disposed with respect to said receptacles between a locking position and an unlocking position such that in said locking position none of said cartridges are manually removable from said respective receptacles through said outer openings and while said physical interlock means is in said unlocking position any of said cartridges are removable from said receptacles through said outer openings;

return means connected to said interlock means yieldably urging said interlock means from said unlocking to said locking position;

lock control means connected to said interlock means for moving said interlock means between said locking and unlocking positions;

said disk cartridge holder moving into said play position of said disk cartridge device engaging said lock control means for moving said physical interlock means from said locking position to said unlocking position while said cartridge holder is disposed at said disk cartridge device whereby said cartridges can be manually inserted into or exited from said array through said outer openings only while said disk cartridge holder is at said play position;

a plurality of multi-cartridge carrying cassettes disposed in said receptacles, respectively;

each of said cassettes having a plurality of cartridge receiving slots for respectively removably receiving respective ones of said cartridges, each said slot having a opening through which said cartridges may be inserted into and removed from the slots;

each of said cassettes having a given number of detent receivers;

each one of said receptacles having a certain number of leaf-spring detents, said certain number being equal to said given number of said detent receivers, each said leaf spring detent having a detent end spring-urged inwardly to the respective receptacle for lockingly engaging said detent receivers such that during insertion or removal of said cassette through a respective one of said outer openings said leaf-spring detents are momentarily urged outwardly of said receptacles for outward movement to enable said detent ends to slide along a predetermined one of said cassettes being inserted or removed from the respective receptacle to and from a predetermined one of said detent receivers;

said interlock means being disposed adjacent to all of said leaf-spring detents for respectively engaging all of said leaf-spring detents while in said locking position for preventing said outward movement whereby none of said cassettes can be removed from said receptacles while said interlock means is in said locking position;

said physical interlock means having a slidable bar disposed along one lateral side of all of said receptacles in said columnar array;

said cartridge locking means in said physical interlock means comprising a plurality of spaced-apart locking teeth extending toward respective ones of said receptacles;

said given number being two, said two detent receivers respectively disposed on opposite side walls of each of said cassettes;

each one of said plurality of leaf spring detents having one end stationarily affixed respectively to said receptacles adjacent said inner openings, locking ends respectively on each of said leaf spring detents yieldably engaged in said detent receivers, respectively, such that insertion of a predetermined one of said cassettes pushes said leaf springs outwardly of said receptacles, respectively;

said physical interlock means being disposed adjacent said locking ends of said leaf spring detents such that while said physical interlock means is in said locking position said teeth are respectively disposed in a blocking relationship to said locking ends of said leaf spring detents for blocking said outwardly movement of all said detents whereby none of said cassettes in said respective receptacles can be removed nor inserted from nor into said receptacles and while said physical interlock means is in said unlocking position all of said locking teeth are displaced along the columnar array from said leaf spring detents, respectively;

said return means having spring means connected to one end of said bar for yieldably urging said bar away from said disk cartridge device toward said locking position; and said lock control means on said physical interlock means being an arm extending into a path of travel of said cartridge holder for engagement by said cartridge holder as said cartridge holder is leaving said receptacles and approaching said disk cartridge device along said path of travel for urging said bar to move toward said media device for moving said bar from said locking position to said unlocking position while said cartridge holder is adjacent said disk cartridge device.

2. Apparatus as set forth in claim 1, further including in combination:

a plurality of flag means respectively disposed adjacent said leaf spring detents of said receptacles in a predetermined sensing relationship with said leaf spring detents for detecting and memorizing said outward movement of leaf spring detents;

scan means in said automatic control means for sensing and indicating all of said memorized outward movements; and inventory updating means connected to said scan means indicating a memorized one of said outward movements for actuating said accessing means and said disk cartridge device to fetch each said cartridge stored in a cassette in each of said receptacles, transport the fetched cartridges to said disk cartridge device and actuating said disk cartridge device to read and supply to said automatic control means identifications of said fetched cartridges, respectively and for actuating said accessing means to return each of said fetched cartridge to said cassettes, respectively.

3. Apparatus as set forth in claim 2, further including in combination:

said automatic control means being responsive to an actuation of said manual control means button after moving said holder to said disk cartridge device in response to said first actuation of said button to move said holder away from said disk cartridge device whereby said spring means moves said physical interlock means from said unlocking position to said locking position.

4. Apparatus as set forth in claim 3, further including in combination:

said plurality of flag means respectively having magnetic leaf spring indicators, said leaf spring indicators having one end portions affixed respectively to one of said side walls of said receptacles, said leaf spring indicators respectively having a distal end portion movably disposed adjacent respective ones of said detent locking ends for movement outwardly of the respective receptacle with said outward movement of said locking ends;

a plurality of magnet means respectively stationarily mounted on said one of said side walls of said receptacles for releasably retaining said distal end portions at said outwardly movement for indicating that a respective one of said cassettes was inserted or removed from the respective receptacle;

said cartridge holder having sensing means for sensing that said distal end portions are releasably held by said magnet means, respectively, for indicating to said automatic control means that said respective cassettes were inserted or removed from the receptacles, respectively; and bevel means on said cartridge holder for engaging said leaf spring indicators in said releasably held position for releasing the leaf spring indicator from the respective magnet means for removing said indications of cassette removal or insertion, respectively.

5. Data storage apparatus for storing and using a plurality of media cartridges, an improvement including, in combination:

a first plurality of cassettes, each of said cassettes for storing a second plurality of said media cartridges;

a columnar array of receptacles, each said receptacle for storing a respective one of said cassettes, said receptacles respectively having outer openings for enabling manual access for inserting and removing said cassettes into and from said receptacles, said receptacles respectively having inner openings for enabling automatic fetching and storing said media cartridges, one at a time, into and from said cassettes respectively disposed in said receptacles;

a media device disposed adjacent one end of said array and having a play position at which any one of said media cartridges can be accessed by said media device for predetermined data operations;

accessing means disposed adjacent said columnar array and said media device, a cartridge holder in said accessing means and movably disposed with respect to said columnar array and said play position in said media device, said cartridge holder having means for respectively fetching and storing one of said media cartridges from and into a respective one of said cassettes through said inner openings of said receptacles, respectively, and for mounting said fetched one of said media cartridges into said play position in said media device and for demounting said mounted one of said media cartridges from said media device for storage in a predetermined one of said cassettes;

manual control means having an actuating button and a display;

automatic control means connected to said media device, to said accessing means and to said manual control means for responding to said actuating button being actuated to move said holder to said play position in said disk cartridge device for facilitating manual insertion and removal of predetermined ones of said disk cartridges into and from said receptacles through said outer openings, respectively;

physical interlock means disposed adjacent to and being connected to all of said receptacles and having locking and unlocking states that respectively simultaneously lock all of said cassettes in said respective receptacles and simultaneously unlock all of said cassettes respectively mounted in said receptacles for insertion into or removal from said receptacles respectively through said outer openings, means in said interlock means responsive to said holder leaving said play position to actuate said interlock means to said locking state;

said automatic control means connected to said interlock means for responding to said actuating button being actuated to move said cartridge holder to said play position and to actuate said interlock means to be in said unlocking state for permitting manual removal and insertion of said cassettes through said outer openings from and to said receptacles respectively;

display control means in said automatic control means connected to said display and to said accessing means for responding to said actuating button being actuated and said accessing means moving said holder to said play position of said media device for supplying a signal to said display to indicate that cartridges may be manually removed and inserted into said columnar array;

said physical interlock means having a slidable bar disposed along one lateral side of all of said receptacles in said columnar array;

locking means in said physical interlock means comprising a set of spaced-apart locking teeth extending toward respective ones of said receptacles;

two detent receivers respectively disposed on opposite side walls or each of said cassettes;

a plurality of leaf spring detents each having one end stationarily affixed respectively to said receptacles adjacent said inner openings, locking ends respectively on each one of said leaf spring detents, yieldably engaged in said detent receivers, respectively, such that insertion of a predetermined one of said cassettes pushes said leaf springs outwardly of said receptacles, respectively;

said physical interlock means being disposed adjacent said locking ends of said leaf spring detents such that while said physical interlock means is in said locking position said teeth are respectively disposed in a blocking relationship to said locking ends of said leaf spring detents for blocking said outwardly movement of all said detents whereby none of said cassettes in said respective receptacles can be removed nor inserted from nor into said receptacles and while said physical interlock means is in said unlocking position all of said locking teeth are displaced along the columnar array from said leaf spring detents, respectively;

said return means having spring means connected to one end of said bar for yieldably urging said bar away from said disk cartridge device toward said locking position; and said locking means having an arm extending into a path of travel of said cartridge holder for engagement by said cartridge holder as said cartridge holder is leaving said receptacles and approaching said disk cartridge device along said path of travel for urging said bar to move toward said media device for moving said physical interlock means between said locking position and said unlocking position and holding said physical interlock means in said unlocking position only while said cartridge holder is at said play position.

* * * * *